US012770590B2

(12) United States Patent
Dickens

(10) Patent No.: US 12,770,590 B2
(45) Date of Patent: Oct. 20, 2026

(54) ELECTRIC GUITAR

(71) Applicant: CIRCLE INSTRUMENTS LTD, Mells (GB)

(72) Inventor: Anthony Dickens, London (GB)

(73) Assignee: CIRCLE INSTRUMENTS LTD, Mells (GB)

(*) Notice: Subject to any disclaimer, the term of this patent is extended or adjusted under 35 U.S.C. 154(b) by 971 days.

(21) Appl. No.: 18/012,884

(22) PCT Filed: Jun. 29, 2021

(86) PCT No.: PCT/IB2021/055789
§ 371 (c)(1),
(2) Date: Dec. 23, 2022

(87) PCT Pub. No.: WO2022/003548
PCT Pub. Date: Jan. 6, 2022

(65) Prior Publication Data
US 2023/0267898 A1 Aug. 24, 2023

(30) Foreign Application Priority Data
Jun. 30, 2020 (GB) ..................................... 2010027

(51) Int. Cl.
*G10F 1/20* (2006.01)
*G10D 1/08* (2006.01)
(Continued)

(52) U.S. Cl.
CPC ............... *G10F 1/20* (2013.01); *G10D 1/085* (2013.01); *G10D 3/173* (2020.02);
(Continued)

(58) Field of Classification Search
CPC .......... G10D 1/085; G10D 3/173; G10D 3/12; G10F 1/20; G10H 1/0008; G10H 1/26;
(Continued)

(56) References Cited

U.S. PATENT DOCUMENTS

2005/0172779 A1 8/2005 Gilmore et al.
2009/0229445 A1* 9/2009 Courtright ............... G10D 3/22
84/453

(Continued)

FOREIGN PATENT DOCUMENTS

CN 110349560 A * 10/2019 ............. G10H 3/183
CN 210575073 U * 5/2020

(Continued)

OTHER PUBLICATIONS

U.K. Intellectual Property Office, "Search Report under Section 17," mailed Feb. 12, 2021, for U.K. Application No. GB2010027.7, 2 pages.

(Continued)

*Primary Examiner* — Jeffrey Donels
*Assistant Examiner* — Philip G Scoles
(74) *Attorney, Agent, or Firm* — Riyon Rae Harding

(57) ABSTRACT

An electric guitar comprising a rotatable disc positioned underneath the guitar strings and comprising a plurality of attachment points; at least one pic comprising a body configured to be received by an attachment point of the rotatable disc and a flexible wire member extending from the body away from the rotatable disc; drive means configured to rotate the rotatable disc relative to the guitar body such that each time the at least one pic passes the at least one string it engages therewith causing the at least one string to vibrate and the at least one pickup generates an electrical signal; and an output jack for outputting the electrical signal to an amplifier.

20 Claims, 10 Drawing Sheets

(51) Int. Cl.

| | |
|---|---|
| ***G10D 3/173*** | (2020.01) |
| ***G10H 1/00*** | (2006.01) |
| ***G10H 1/26*** | (2006.01) |
| ***G10H 1/34*** | (2006.01) |
| ***G10H 3/18*** | (2006.01) |
| *G10D 3/12* | (2020.01) |

(52) U.S. Cl.
CPC ............. *G10H 1/0008* (2013.01); *G10H 1/26* (2013.01); *G10H 1/348* (2013.01); *G10H 3/18* (2013.01); *G10D 3/12* (2013.01); *G10H 2220/265* (2013.01); *G10H 2220/461* (2013.01)

(58) Field of Classification Search
CPC .... G10H 1/348; G10H 3/18; G10H 2220/265; G10H 2220/461
USPC ............................................................. 84/723
See application file for complete search history.

(56) References Cited

U.S. PATENT DOCUMENTS

| | | | | |
|---|---|---|---|---|
| 2012/0103163 | A1* | 5/2012 | DuPra .................... | G10D 3/173 84/9 |
| 2015/0294659 | A1* | 10/2015 | Chapman ............... | G10D 1/085 84/743 |
| 2019/0392794 | A1* | 12/2019 | Campbell .............. | G10D 3/173 |

FOREIGN PATENT DOCUMENTS

| | | | |
|---|---|---|---|
| GB | 2581949 | A | 9/2020 |
| JP | H0619459 | A | 1/1994 |

OTHER PUBLICATIONS

PCT, "International Search Report," mailed Oct. 5, 2021, for PCT Application No. PCT/IB2021/055789, 4 pages.

* cited by examiner

ELECTRIC GUITAR

This application is a national stage application under 35 U.S.C. § 371 of International Application No. PCT/IB2021/055789, filed Jun. 29, 2021, entitled "ELECTRIC GUITAR," which claims priority to United Kingdom Patent Application No. 2010027.7, filed Jun. 30, 2020, the contents of all of which are hereby incorporated herein in their entirety by reference for all purposes.

FIELD

The present invention relates to an electric guitar and a system for generating music comprising an electric guitar and a controller.

BACKGROUND

Electric guitars have been in use since at least the 1920s and follow a common template of a solid body, a bridge and a neck. This is generally the same template as a conventional acoustic guitar except that acoustic guitars have a hollow body. A prior art electric guitar (10) is shown in FIG. 1. The lower part of the guitar (10) is the solid body (12) and the upper extremity is the head (14). The solid body (12) and head (14) are connected by a neck (16). A plurality of strings (18) run between the body (12) where they are anchored to a bridge (20) and the head (14) where the strings (18) are anchored to respective tuners (22). The tuners (22) are generally positioned such that half are located on one side of the neck (16) and the other half are located on the other side of the neck (16). The electric guitar (10) illustrated in FIG. 1 has three strings (18) located on each side of the neck (16). At least one pickup (24) is located on the solid body (12) and underneath the strings (18) between the bridge (20) and the point at which the neck (16) meets the solid body (12). The electric guitar (10) illustrated in FIG. 1 has a single pickup (24) but different types of electric guitar can have two, three or more pickups (24). Electric guitars with more than one pickup may (24) also have a pickup selector (26) to select which pickup(s) to activate. Output from the electric guitar (10) is output to an amplifier by way of an output audio jack (28). The output can be varied through manipulation of volume and tone control knobs (30).

In use, vibration of the strings (18) is converted into electrical signals output to the amplifier for reproduction by a loudspeaker. The electrical signal is generated in the pickup (24) by a coil wrapped around a permanently magnetic pole. The strings (18) are made from a magnetic material so that when the strings (18) vibrate, a signal is generated in the coil. This signal is output to the amplifier.

Conventional electric guitars allow for a wide variety of sound to be created by a user. An electric guitar would usually be slung over the user's shoulder with the body supported by one hand and the neck held by the other hand. The hand supporting the body would be used to pluck the strings using a pic. The hand holding the neck is used to depress the strings and change the tone and pitch of the sound produced by the electric guitar. This part of the electric guitar is known as the fretboard and the horizontal projections that are spaced along the neck are known as frets.

The invention creates sounds, rhythms and tonality that would be impossible using a conventional guitar. Professional guitar players consistently strive to create new and improved sound using their chosen instrument. Amateur guitar players strive to improve their skills and emulate the high-quality sound that professional guitar players can create. The claimed device keeps time in relation to tempo very accurately, therefor it could be used by amateurs to strum in perfect time. In each case there is a desire to create new, high quality sound that can be replicated.

It is against this background that the present invention has arisen.

SUMMARY

An aspect of the present invention provides a stringed instrument comprising: a body; a head connected to the body by a neck; at least one string anchored to both the body and the head and extending along the neck; at least one pickup for converting vibrations from the at least one string into electrical output signals; a rotatable disc positioned underneath the strings and comprising a plurality of attachment points; at least one pic comprising a body configured to be received by an attachment point of the rotatable disc and a flexible wire member extending from the body away from the rotatable disc; drive means configured to rotate the rotatable disc relative to the body such that each time the at least one pic passes the at least one string it engages therewith causing the at least one string to vibrate and the at least one pickup generates an electrical signal; and an output jack for outputting the electrical signal to an amplifier.

While electric guitars are capable of generating a wide range of sounds, their utility is still limited by: a) the skill level of the user; b) the basic need to use one hand to pluck the strings and the other hand to support the neck and operate the fret board; and c) the speed at which the strings can be plucked. The applicant has discovered that use of a rotational disc underneath the strings can provide a number of benefits to electric guitar users including: i) freeing up the dominant hand to vary the tone of the sound by depressing the strings in the vicinity of the pickup; ii) allowing for repeatable and consistent generation of a tone and pitch depending on the speed of rotation of the rotatable disc, the position of the pic and the stiffness of the pic; and iii) simplified operation of an electric guitar.

In one embodiment wherein the rotatable disc may comprise a steel disc and a non-ferrous covering and an aperture therethrough such that the strings are anchored to the body inside the rotatable disc. The non-ferrous covering may comprise a plurality of cut-outs, each cut-out defining an attachment point for receiving a respective pic therein. Each pic comprises a body having a first end comprising a magnet and a second end having a flexible wire member extending therefrom, and wherein the first end of each pic is inserted into a respective cut-out through the non-ferrous covering of the rotatable disc and the magnet engages the steel disc.

Each of the cut-outs provides a potential attachment point for a pic such that there is a large amount of flexibility in connection with pic placement on the rotatable disc. The position of each pic relative to another pic has an impact on the sound generated by the electric guitar hence it is advantageous to have the ability to move the pics. The combination of a magnet as part of the pics and a steel disc advantageously provides for simple removal and replacement of pics without the need to use any kind of tools. The non-ferrous covering provides a lateral support for the pics so that they are securely attached to the rotatable disc and will not become detached during use. The number of cut-outs and their positioning is dependent on the intended time signature that is provided by use of the rotatable disc. In the illustrated embodiment, the time signature is 4/4. This means that the beats in the bar must add up to four quarter beats, i.e., sixteen beats in the bar. The beat is counted 1, 2, 3, 4, 1, 2, 3, 4 and so on. It will be appreciated that the rotatable disc may have any feasible time signature. For example, the time signature could be ¾. This means that the beats in the bar must add up to three quarter beats, i.e., twelve beats in the bar. In another example, the time signature could be ⅞. This means that the beats in the bar must add up to seven eighth beats, i.e., fifty-six beats in the bar.

The at least one pic may comprise a plurality of pics and the dimension of each of the plurality of pics from the first end thereof to the end of the flexible wire member is the same for each respective pic.

The more pics attached to the rotatable disc, the more complicated the soundtrack that can be generated. This necessitates repeatability of tone each time a pic engages and plucks each string. The applicant has discovered that to achieve the required repeatability, the length of each pic needs to be substantially the same. The length of the wire determines the timing of the stroke. The string is plucked only when the pic clears the string. The tone produced by plucking a string could be affected by using a different material or thickness of pic. A thicker, or stiffer, pic would revert to its default orientation and position with more force than a thinner, or less stiff, pic.

The electric guitar may further comprise a primary switch associated with each of the at least one strings that can be toggled between an on position in which vibrations from the at least one string are allowed to pass through the primary switch for output to an amplifier by the at least one pickup and an off position in which vibrations from the at least one string are blocked to prevent the signals passing through the primary switch for output to an amplifier. The at least one string may comprise six strings and the primary switch may comprise six switches, wherein each switch is associated with a respective string.

Each individual string can be turned on or off by way of software that is connected to the electric guitar as an input. However, the software cannot be modified on-the-fly to turn a string on or off mid-session. The primary switches allow the user to spontaneously turn one or more strings on or off at any time by simply activating the relevant switches.

Each string of the electric guitar produces a different tone. As the pic passes underneath the strings it engages and plucks each string causing it to vibrate.

In conventional electric guitars, the vibration generated by each string would be converted into electric signals by a pickup and output to an amplifier. This isn't a problem in conventional electric guitars as the user plucks the strings individually or collectively in accordance with the sound they wish to generate. In an electric guitar according to embodiments of the invention, greater control over the sound generated is possible, and indeed required, thus individually controlling whether each string is "active", or not, is highly advantageous.

The electric guitar may further comprise six secondary switches, wherein each secondary switch is associated with a respective primary switch and string, and wherein when a primary switch is in the off position, the associated secondary switch is operable to selectively permit a signal from the associated string to pass through the secondary switch for output to the amplifier.

In one embodiment of the invention, the electric guitar comprises six primary switches and six secondary switches. As described above, the primary switches simply turn the relevant switch with which they are associated on or off. The secondary switches provide additional functionality in that switches that are turned off can be temporarily turned on and off simply by activating and de-activating the switch. In the case of a depressible button, the user is able to depress the button to activate the secondary switch and then let go to deactivate the secondary switch. This provides the user with the ability to create different sound effects than would be possible with a string that is either on or off.

The primary switches referred to previously provide simple on/off control for each individual string of the electric guitar. In some circumstances it might be desirable to make a string "active" for a short period of time while the string remains "inactive" for the remainder, or other parts, of a session. The secondary switches of embodiments of the invention may be temporarily operated to make on or more switches active for the duration of time that the secondary switch(es) are operated. This provides individualised control for each string to permit even greater control of the sound generated by the electric guitar.

The electric guitar may further comprise at least one motor operable to turn the rotatable disc relative to the body.

While the rotatable disc may be turned manually in some embodiments of the invention, it is envisioned that it will be turned by way of one or more motors. Use of one or more motors allows for the speed and continuity of rotation of the rotatable disc to be accurately and repeatedly controlled. This is essential when seeking to play good quality music and repeating the general sound of the music time and time again.

The electric guitar may further comprise a plurality of bearings for supporting the rotatable disc.

To permit smooth and unimpeded rotation of the rotatable disc it is laid on a plurality of bearings to facilitate rotation of the rotatable disc. At least one of the bearings may be driven by the one or more motors to impart rotation to the rotatable disc.

The rotatable disc may comprise a first half and a second half joinable together to form a disc and attachment means for attaching the first and second half of the rotatable disc together.

While some embodiments of the invention utilise a one-piece rotatable disc, such a configuration requires the strings of the electric guitar to be removed from the bridge thereof in order for the rotatable disc to be removed or replaced. This can be mitigated by providing the rotatable disc in two, or more, joinable pieces such that the pieces can be detached and removed from/replaced on the electric guitar without removal of the strings.

The rotatable disc may comprise a plurality of rotatable discs arranged concentrically such that each of the plurality of rotatable discs is operable to rotate independently of any other rotatable disc.

Such an arrangement of rotatable discs provides even greater flexibility around the type and variety of sound that can be generated using the electric guitar. Arranging the rotatable discs such that each is rotatable independently means that each rotatable disc can be rotated at a different speed thus increasing the complexity of soundtrack that can be generated using the electric guitar.

Each rotatable disc may be rotated by way of respective motors.

Use of separate motors to rotate each rotatable disc provides a great degree of control over rotation of the rotatable discs. For example, in an embodiment having four rotatable discs, two rotatable discs may rotate in a clockwise direction and two may rotate in an anticlockwise direction. One of each of the clockwise and anticlockwise rotatable discs may rotate at 10 revolutions per minute whereas the other one of each of the clockwise and anticlockwise rotatable discs may rotate at 15 revolutions per minute, for example. It will be appreciated that there is a huge range of configurations that can be provided using the electric guitar of the present invention.

Another aspect of the invention provides a system for generating sound, the system comprising: an electric guitar comprising: a body; a head connected to the body by a neck; at least one string anchored to both the body and the head and extending along the neck; at least one pickup for converting vibrations from the at least one string into electrical output signals; a rotatable disc positioned underneath the strings and comprising a plurality of attachment points; at least one pic comprising a body configured to be received by an attachment point of the rotatable disc and a flexible wire member extending from the body away from the rotatable disc; drive means configured to rotate the rotatable disc relative to the body such that each time the at least one pic passes the at least one string it engages therewith causing the at least one string to vibrate and the at least one pickup generates an electrical signal; and an output jack for outputting the electrical signal to an amplifier; and a controller for controlling rotation of the rotatable disc.

The controller may comprise a first control for varying the constant speed of the at least one motor and a second control for varying the variable speed of the at least on motor at a plurality of points along the path of rotation of the rotatable disc.

The controller may further comprise a phase control function for turning the rotatable disc forwards or backwards relative to the beat of a music soundtrack or in response to a timecode generated by external hardware or software.

The controller may further comprise a third control for varying the variable speed of the motor at multiple points around each rotation of the rotatable disc.

The controller may further comprise a fourth control for controlling signals transmitted from a programmable circuit board to the controller to sync rotation of the rotational disc with, before or behind the beat of a soundtrack.

The controller may further comprise a fifth control for selectively determining whether the beat of the soundtrack is controlled by the fourth control of the controller or an external device.

The controller may further comprise a foot pedal that performs one or more of the first control, second control, third control, fourth control or fifth control functions. The controller may further comprise a selector switch for determining which of the first, second, third, fourth or fifth control functions is operated by the foot pedal.

FIGURES

Aspects of the invention will now be described by way of reference to the following figures.

DESCRIPTION

Figure 1:
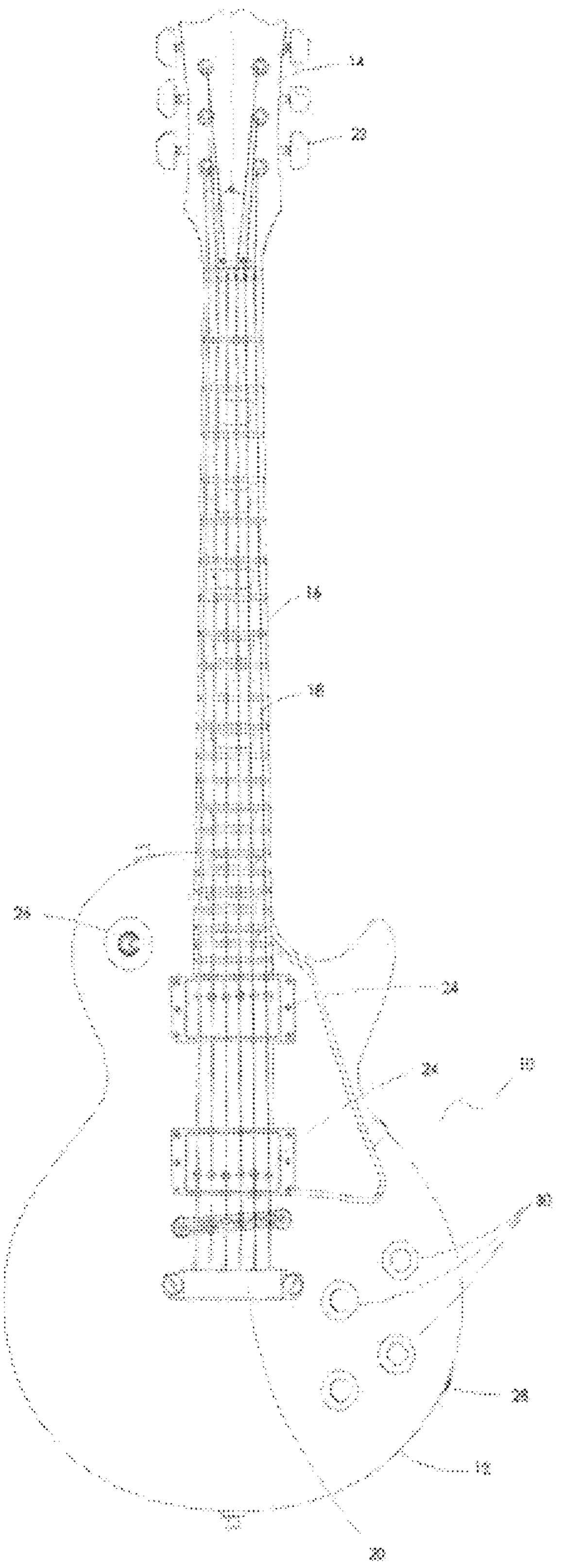
FIG. 1 depicts an example of a convention prior art electric guitar.
Figure 2:
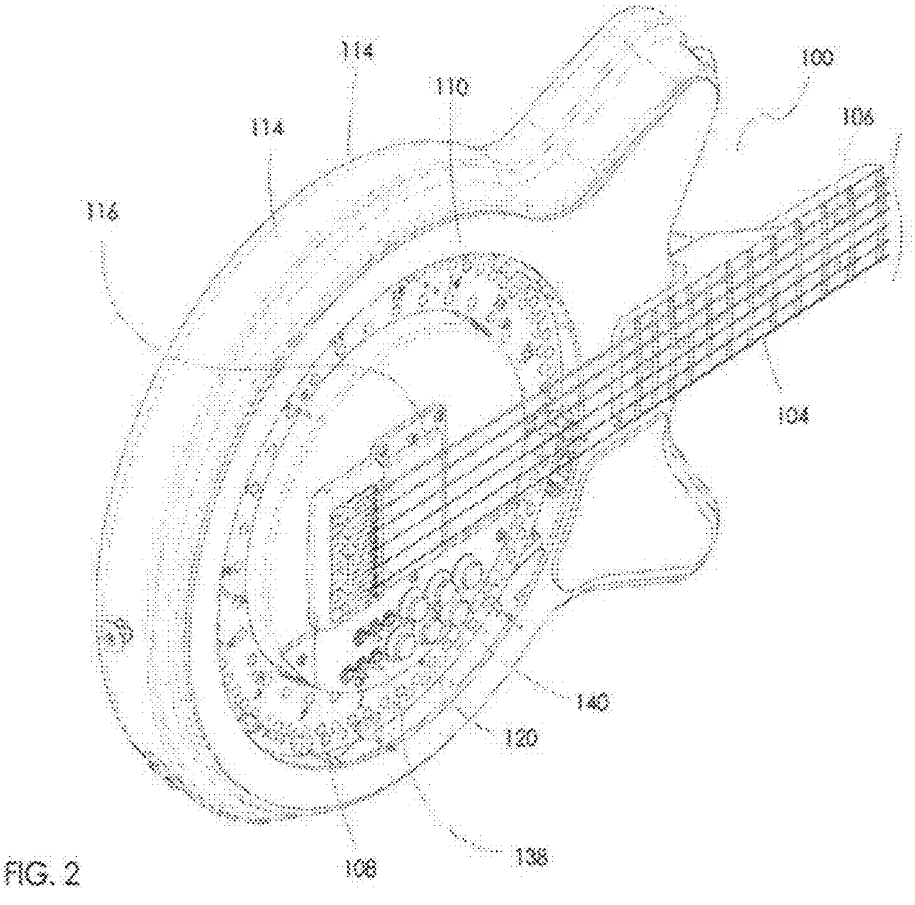
FIG. 2 illustrates an isometric view of an electric guitar according to aspects and embodiments of the invention.
Figure 3:
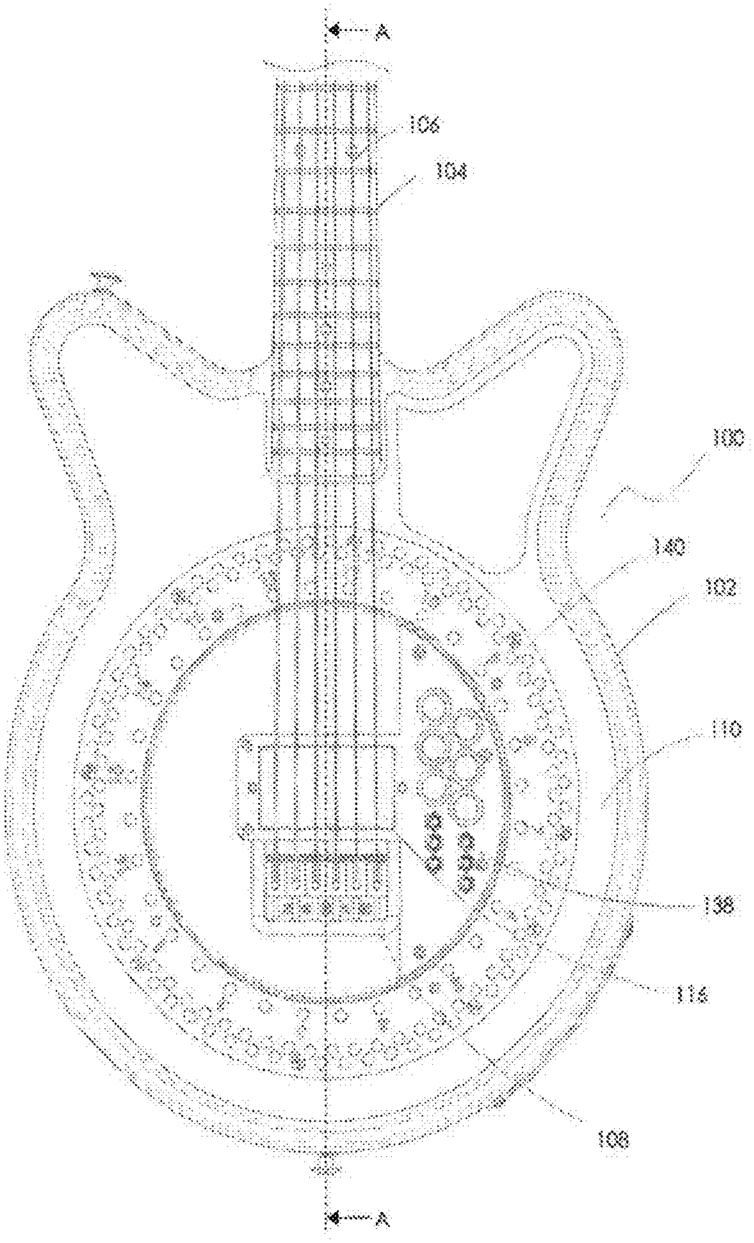
FIG. 3 illustrates a top view of the electric guitar of FIG. 2.
Figure 4:
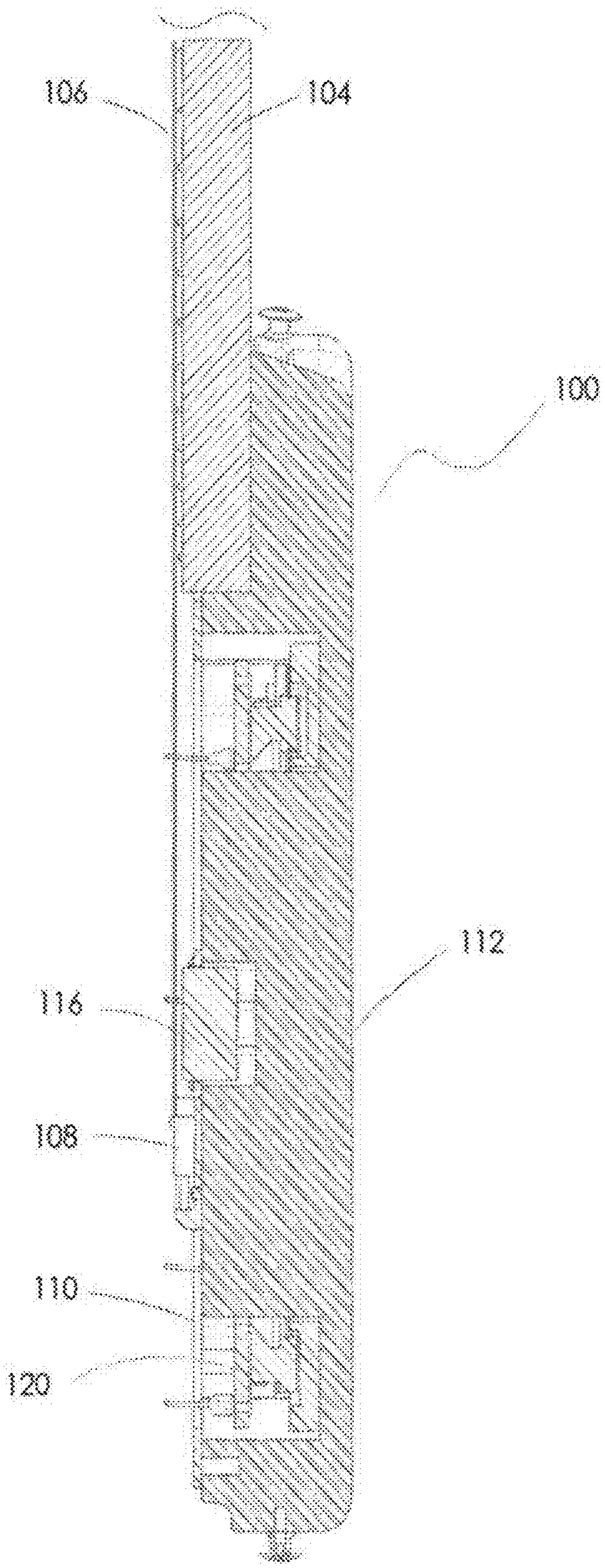
FIG. 4 is a cross-section through the electric guitar of FIGS. 2 and 3 along line X-X, as shown in FIG. 3.
Figure 5:
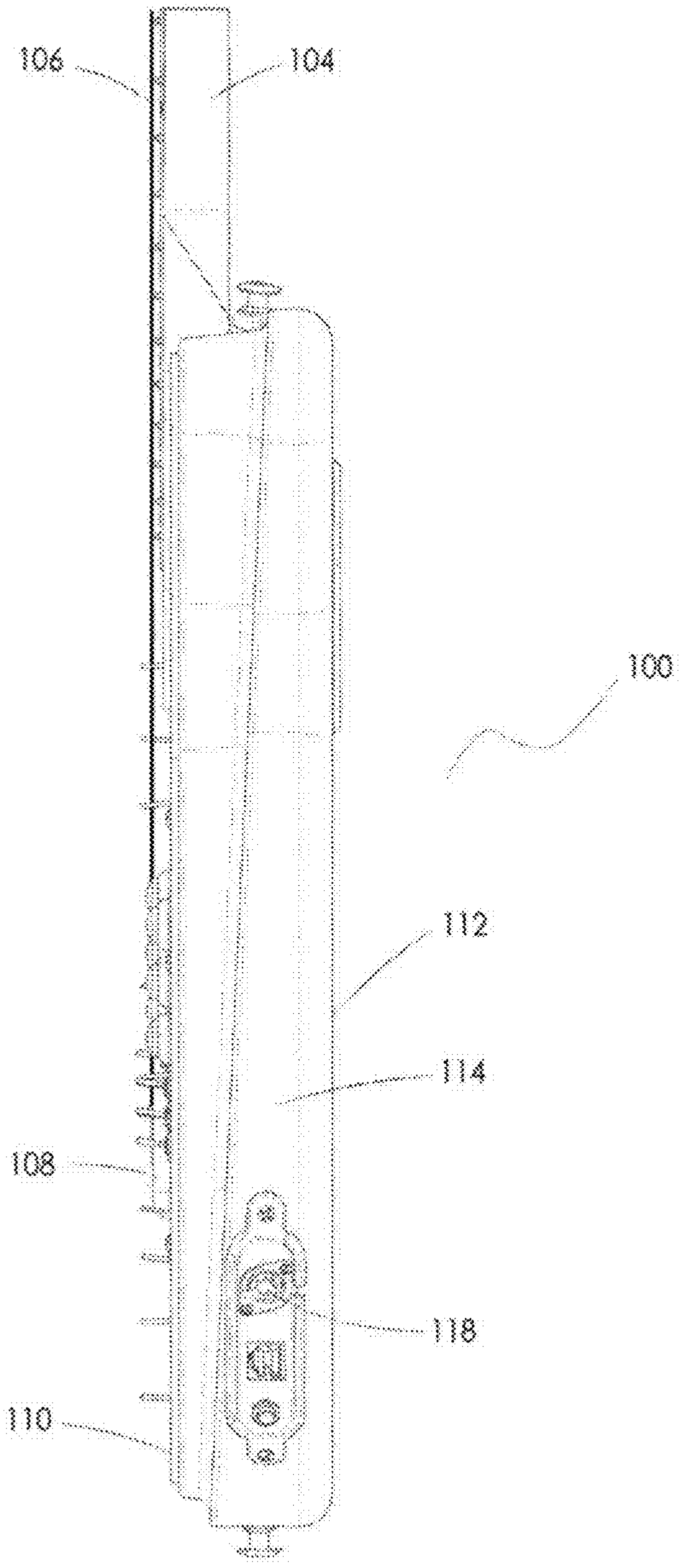
FIG. 5 is a side view of the electric guitar of FIGS. 2 to 4.

This invention will be more fully understood by reference to the detailed description in conjunction with the following figures; wherein the primary object of the present invention is to provide an electric guitar (100) that allows for generation of a wider variety of sounds than a conventional electric guitar and greater control over the sound that a musician is able to generate.

The electric guitar (100) shown in FIGS. 2 to 5 comprises a body (102) and a neck (104) attached to the guitar body (104). A head comprising a plurality of tuners is positioned at the free end of the neck (104). A string (106) is attached to each tuner and extends between a respective tuner and a common bridge (108) that anchors each string (106) to the body (102). The body (102) is defined by a top wall (110), bottom wall (112) and side wall (114). The body (102) is substantially solid.

The body (102) mounts at least one pickup (116) that is positioned beneath the strings (110). When the strings (110) are plucked, the vibrations produced by the moving strings (110) are converted by the at least one pickup (116) into electrical signals for output to an amplifier. The electric guitar (100) is provided with a port or socket (118) for connection to the amplifier. Additional ports, or sockets, may be provided for connection to other auxiliary equipment.

The top wall (110) of the body (102) is recessed to provide a circular indentation for receiving a rotatable disc (120). The rotatable disc (120) surrounds the bridge (108) and the at least one pickup (116). A plurality of bearings (not shown in FIGS. 2-5) are positioned within the recess and the rotatable disc (120) is positioned to engage with the bearings. At least one motor (not shown in FIGS. 2-5) is inserted into a cut-out in the bottom wall (112) of the body (102) and configured to drive to turn the rotatable disc (120) as further described below.

Figure 6:
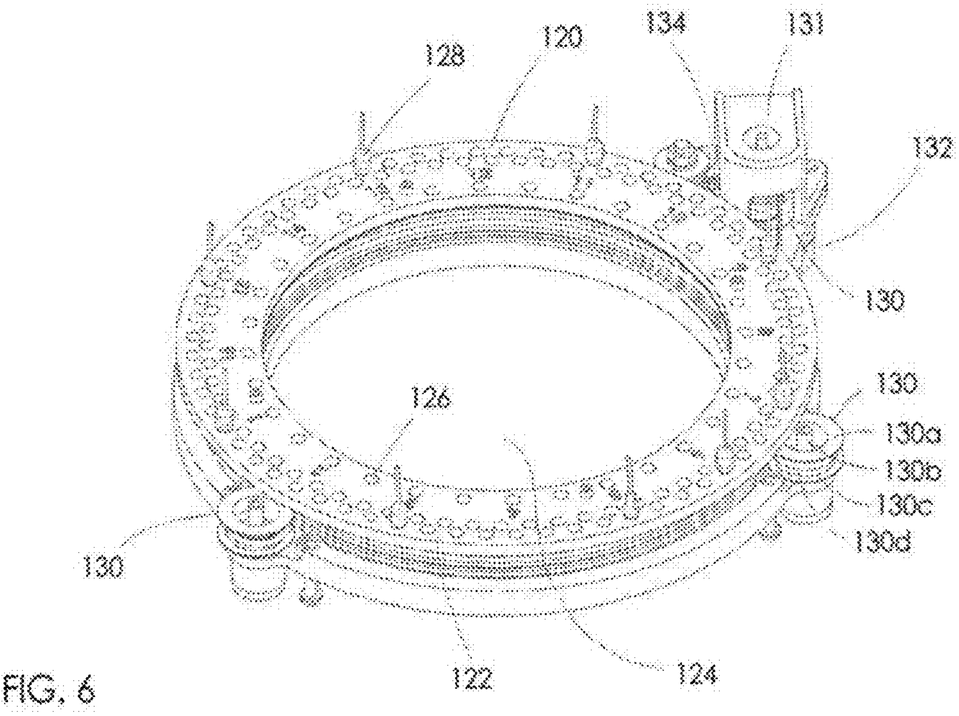
FIG. 6 is an isometric view of a rotatable disc arrangement as used in the guitar of FIGS. 2 to 5.
Figure 7:
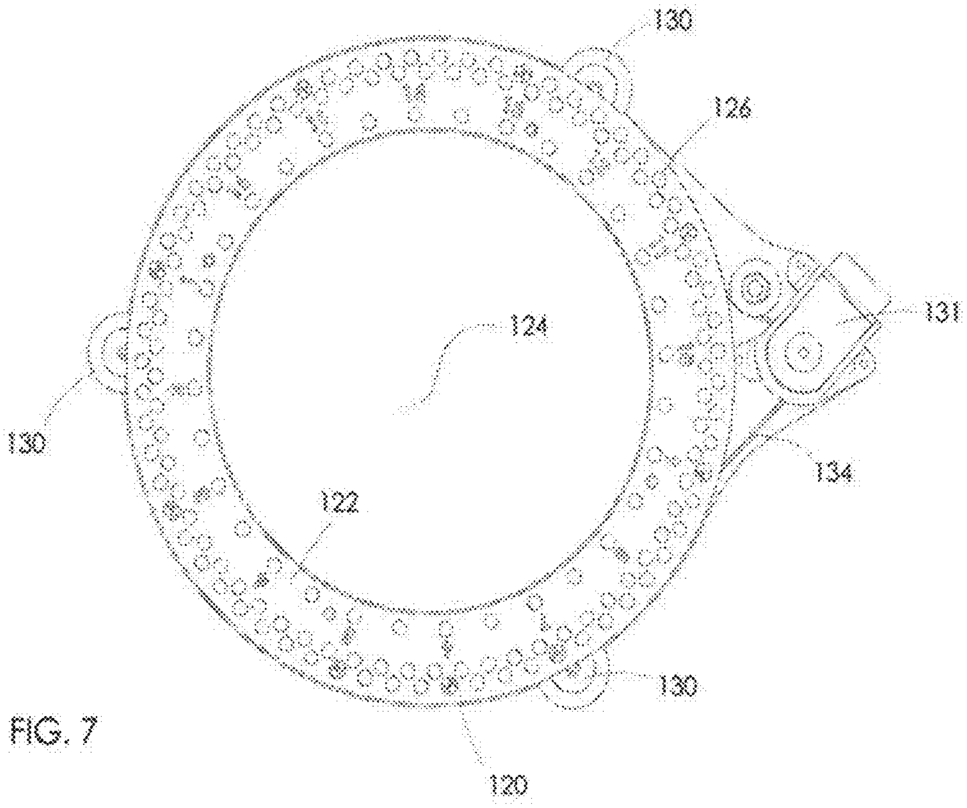
FIG. 7 is a top view of the rotatable disc arrangement of FIG. 6.

As shown in FIGS. 6 and 7, the rotatable disc (120) comprises an annular plate (122) having a steel backing and a non-ferrous covering. The annular plate (122) has a large circular aperture (124) therethough. A plurality of holes (126) are cut through the annular plate (122) and spaced angularly therearound. Each hole (126) is configured to receive a respective pic (128). The outer diameter of the rotatable disc (120), in the case of an embodiment having a single rotatable disc (120), may be 10-500 millimetres. The inner diameter of the rotatable disc (120), in the case of an embodiment having a single rotatable disc, may be 0-490 millimetres. The thickness of the rotatable disc (120) may be 2-10 millimetres. The thickness of the steel backing portion of the rotatable disc (120) may be 0.3-3 millimetres. The thickness of the non-ferrous covering portion of the rotatable disc (120) may be 0.3-10 mm.

The rotatable disc (120) is supported on three bearings (130). However, it will be appreciated that any number of bearings (130) could be utilized while still falling within the scope of the invention. Each bearing (130) comprises a body (130*a*) surrounding a spindle (130*b*). The body (130*a*) is of annular construction and has a circumferential recess (130*c*). A rubber o-ring (130*d*) is positioned within the recess (130*c*) The body (130*a*) is configured to rotate around the spindle (130*b*). The bearings (130) are driven by a motor (132). In some embodiments, each bearing (130) may be directly driven by a respective motor (132). In the illustrated embodiments, a chain or belt (134) extends around a motor bearing (not shown), forming an integral part of the motor (132), and engages a ring (not shown) that sits internally of, and in contact with, each of the bearings (130). The chain or belt (134) contacts the rubber o-ring (130*c*) to facilitate quietened operation of the rotatable disc (120). As the motor (132) rotates it drives the ring which consequently turns the bearings (130) to rotate the rotatable disc (120) relative to the body (102) of the electric guitar (100).

In some embodiments, the motor (132) may incorporate a motor controller (131) to provide at least some of the following: under-voltage, over-voltage, short circuit protection, current limit protection, thermal protection and voltage transients.

Figure 8:
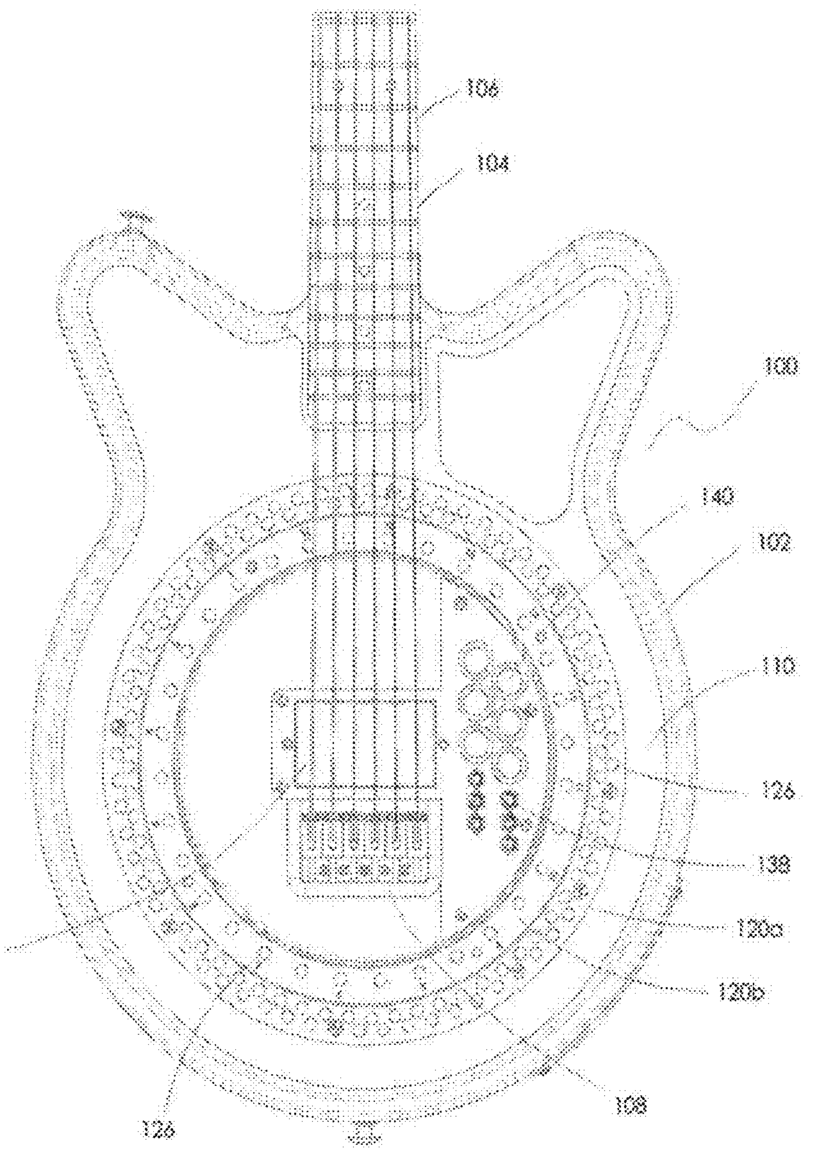
FIG. 8 is a top view of an arrangement of multiple rotatable discs as used in embodiments of the invention.

As shown in FIG. 8, some embodiments of the invention may comprise a plurality of rotatable discs (120) positioned concentrically and rotatable relative to one another. FIG. 8 shows a pair of rotatable discs (120*a*, 120*b*). It will be appreciated that other embodiments could have more than two rotatable discs (120). In an embodiment comprising a pair of rotatable discs (120*a*, 120*b*), a pair of motors (132) may be inserted into apertures in the bottom wall (112) of the body (102) and multiple sets of bearings (130) may be positioned in the recess in the top wall (110) of the body (102) for supporting each of the rotatable discs (120*a*, 120*b*). In such an embodiment, each motor (132) is configured to rotate one of the rotatable discs (120*a*, 120*b*). Alternatively, a single motor (132) could drive both rotatable discs (120*a*, 120*b*)

Figure 9:
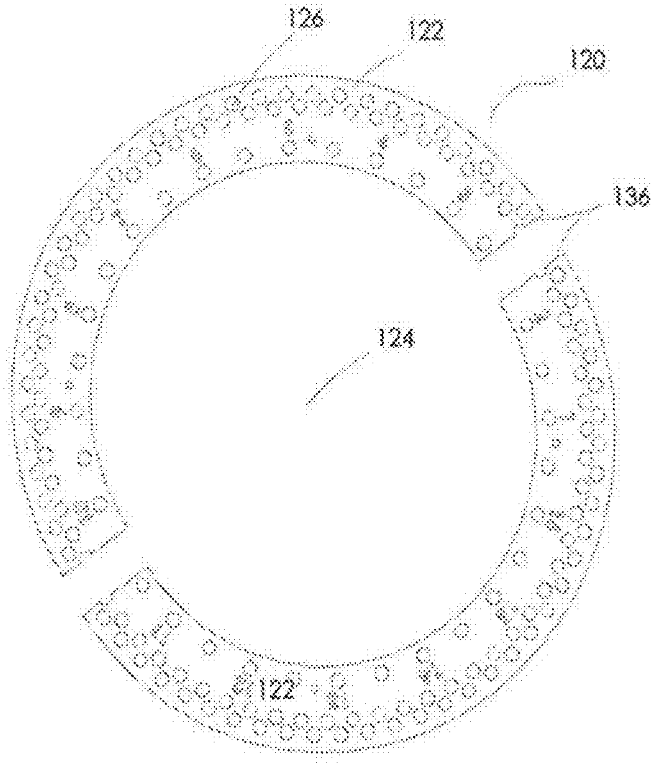
FIG. 9 is a top view of a split rotatable disc as used in embodiments of the invention.

Each rotatable disc (120*a*, 120*b*) may be of unitary construction, as shown in FIGS. 2-8, or split into two or more portions, as shown in FIG. 9. In the case of a rotatable disc (120*a*, 120*b*) split into two or more portions, the portions are attachable by way of an attachment interface (136) such as first and second mating parts on respective adjacent portions of the rotatable disc (120*a*, 120*b*).

The holes (126) cut through the annular plate (122) of the rotatable disc (120*a*, 120*b*) are spaced around the rotatable disc (120*a*, 120*b*) so as to provide a plurality of locations for mounting the pics (128). The sound generated by the guitar (100) can be varied by changing the angular spacing between pics (128). As will be evident from this disclosure, the more pics (128) that are received by holes (126) of a rotatable disc (120*a*, 120*b*), the more times that a string (106) (or a plurality of strings (106)) is plucked during a single rotation of the rotatable disc (120*a*, 120*b*). Similarly, the greater the angular spacing between pics (128) the greater the gap between consecutive plucks of the string (106).

Figure 10A:
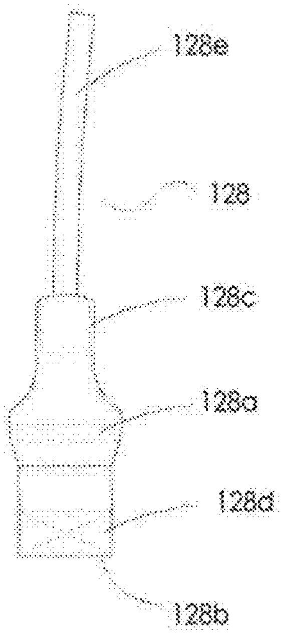
FIGS. 10A and 10B are illustrative views of a pic as used in embodiments of the invention.
Figure 10B:
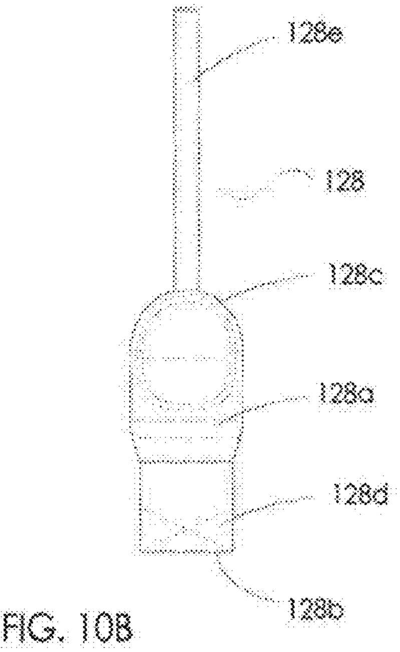

Exemplary pics (128) as used in embodiments of the invention are shown in FIG. 10. Such pics (128) comprise a body (128*a*) having a first end (128*b*) and a second end (128*c*). The first end (128*b*) receives a magnet (128*d*) and the second end (128*c*) receives a flexible wire member (128*e*). The magnet (128*d*) may be moulded into the body (128*a*) or inserted into a recess in the first end (128*b*) of the body (128*a*). The flexible wire member (128*e*) may have varying degrees of stiffness depending on the length and/or thickness of the wire member (128*e*). The length of the wire member (128*e*) determines the timing of the stroke. The string (106) is plucked only when the wire member (128*e*) clears the string (106). The tone produced by plucking a string (106) could be affected by using a different material or thickness of wire member (128*e*). A thicker, or stiffer, wire member (128*e*) would revert to its default orientation and position with more force than a thinner, or less stiff, wire member (128*e*). It will be appreciated that the wire member (128*e*) could be formed from metal, plastic or any other suitable material. Each pic (128) has an identical length from the first end (128*b*) to the free end of the flexible wire member (128*e*). The diameter of the first end (128*b*) of the pic (128) is selected such that it is slightly less than the diameter of each hole (126) through the annular plate (122) of the rotatable disc (120*a*, 120*b*). The magnet (128*d*) provides engagement between the pic (128) and the annular plate (122) of the rotatable disc (120*a*, 120*b*) and the close fit between the diameter of the first end (128*b*) of the body (128*a*) and the diameter of the hole (126) through the annular plate (122) of the rotatable disc (120*a*, 120*b*). This dual engagement between the pic (128) and rotatable disc (120*a*, 120*b*) provides both longitudinal and lateral resistance to detachment of the pic (128) from the rotatable disc (120*a*, 120*b*).

Each string (106) may be turned off individually by a respective switch (138) mounted to the body (102) of the electric guitar (100). The electric guitar (100) illustrated in FIGS. 2 to 5 has six strings (106) and consequently six switches (138). Each switch (138) is associated with a respective string (106). The switch (138) is shown as a toggle switch but could equally be a rocker switch, button, slider, for example. Each switch (138) is movable between an off position and an on position. When the switch (138) is in the off position, vibrations caused when the associated string (110) is plucked are still converted into electrical signals by the pickup (16) but those signals are blocked by the respective switch (138) for the string (106). When the switch (138) is in the on position, vibrations caused when the associated string (106) is plucked are converted into electrical signals by the pickup (116) and output to an amplifier. The pickup (116) comprises individual transducers that can be blocked depending on the position of an associated switch (138). That way, sound output from each of the strings (106) can be selectively turned on and off by a user of the electric guitar (100).

In addition to the switches (138), a button (140) associated with respective strings (106) and switches (138) is also mounted to the body (102) of the electric guitar (100). Each button (140) is operable to activate the associated string (106) when the switch (138) is in the off position. When a button (140) is activated, vibrations caused when the associated string (106) is plucked are allowed to pass through the button (140) for output to an amplifier. In the illustrated embodiment, the button (140) is biased in the off position. Although the disclosed embodiments are described by way of reference to buttons (140), it will be appreciated that any form of component operable to selectively, and intermittently, activate the associated string (106) will form within the scope of the claimed inventions.

Figure 11:
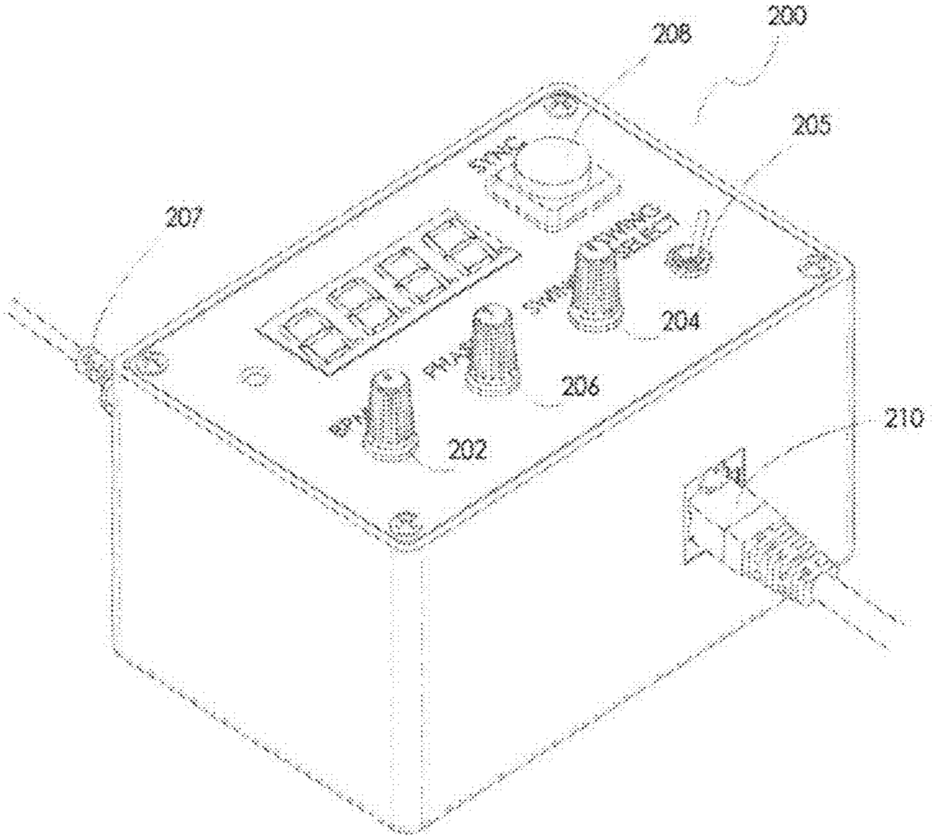
FIG. 11 is an illustrative view of a controller as used in conjunction with the electric guitar of embodiments of the invention.

The sound generated by the electric guitar (100) can also be varied by way of a controller (200), as illustrated in FIG. 11, that is operatively connected to the electric guitar (100).

The controller comprises separate controls to vary the speed and swing of the rotatable disc (120*a*, 120*b*). The controller (200) also comprises separate controls for syncing rotation of the rotatable disc (120*a*, 120*b*) to a point before or after the beat of a particular soundtrack and to sync with specialist computer software. In the embodiment illustrated in FIG. 11, the controller (200) comprises a first control (202) for varying the speed of rotation of the rotatable disc (120*a*, 120*b*) by varying the input speed of the electric motor (132) such that the input speed of the electric motor (132) is directly proportionate to the rotational speed of the rotatable disc (120*a*, 120*b*). The rotational speed of the rotatable disc (120*a*, 120*b*) can be more accurately controlled by changing the current to the motor in response to feedback of a sensor (131) that analyses characteristics of the rotation of the rotatable disc (120*a*, 120*b*) In other words, the rotational speed of the rotatable disc (120*a*, 120*b*) may be varied between 1-500 revolutions per minute. A second control (204) provides for variation of the swing of the rotatable disc (120*a*, 120*b*). The term "swing" refers to variation of the rotational speed of the rotatable disc (120*a*, 120*b*) at different points during a single rotation. The second control (204) may allow adjustment of the amount of swing as a percentage. A third control (205) may allow the location of swing to be varied at one, or more than one, location of the rotation of the rotatable disc (120*a*, 120*b*). A fourth control (206) fourth control (208) allows for signals from a programmable circuit board to be sent to and from the controller (200) to sync rotation of the rotational disc (120*a*, 120*b*) with, before or behind the beat of a soundtrack. A fifth control (208) determines whether the BPM of the rotatable disc (120*a*, 120*b*) is controlled by the controller (200) or an external device. When the fifth control is in on position the BPM of the rotatable discs (120*a*, 120*b*) is controlled by the external device and when the fifth control is in an off position the BPM of the rotatable disc is controlled by the controller (200). Each of the first, second, third, fourth and fifth controls (202, 204, 205, 206, 208) may be in the form of a rotatable knob, a switch, a button, or a combination thereof. The controller (200) is connected to the electric guitar (100) by way of an ethernet cable (210). Power is provided to the controller by either an internal battery or a micro-USB cable (207). Although not shown in the figures, some embodiments of controller (200) may further comprise a foot pedal that performs the function of one or more of the first, second, third, fourth or fifth control (202, 204, 205, 206, 208). In such an embodiment, output of the foot pedal is determined by operation of a selection switch.

Figure 12:
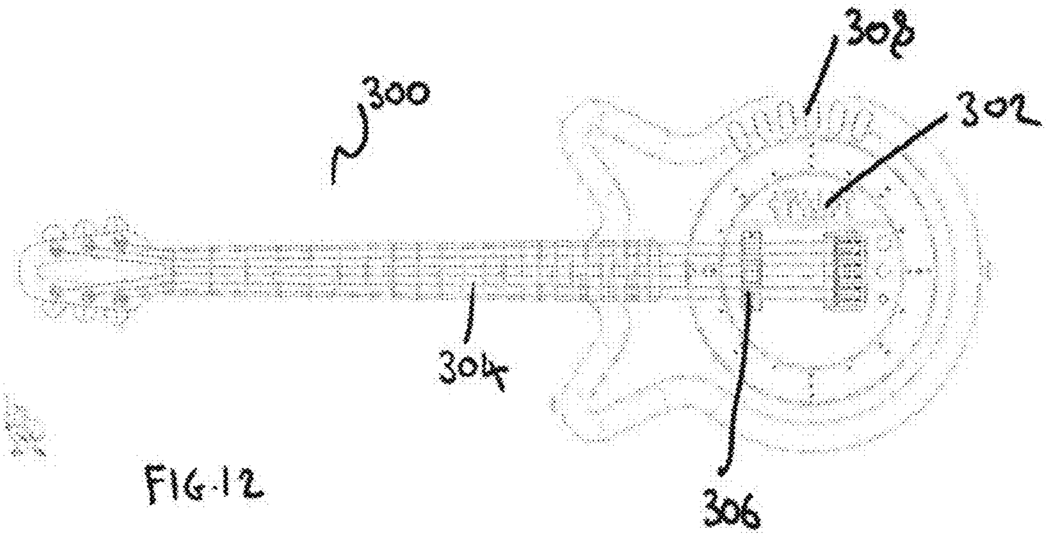
FIG. 12 illustrates an isometric view of a second embodiment of electric guitar.
Figure 13:
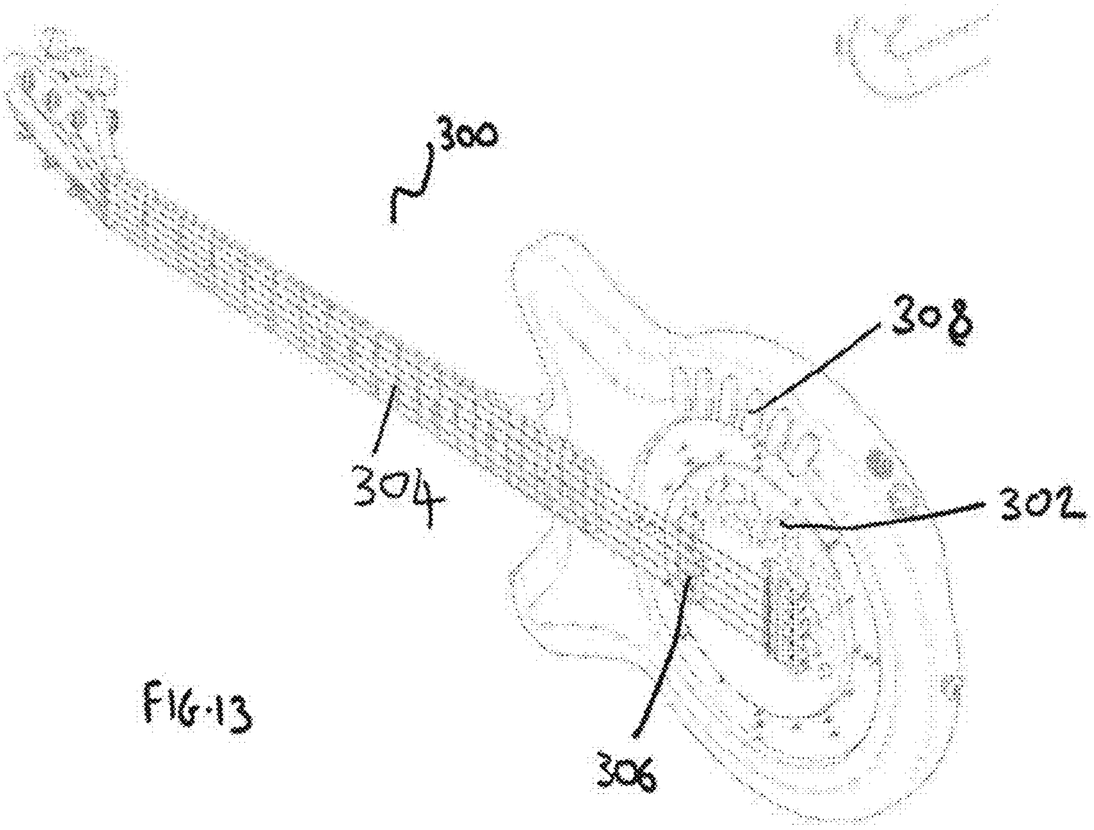
FIG. 13 is a top view of the electric guitar of FIG. 12.

As shown in FIGS. 12 and 13, an electric guitar (300) according to certain embodiments of the invention comprises six faders (302), each associated with a respective string (304). Each fader (302) is moveable between an off position and a 100% on position. When the switch (302) is in the off position, vibrations caused when the associated string (304) is plucked are still converted into electrical signals by a pickup (306) but those signals are blocked by the fader (302) for that particular string (304). When the fader (302) is in a 100% on position, vibrations caused when the associated string (304) is plucked are converted into electrical signals by the pickup (306) and output to an amplifier. The pickup (306) comprises individual transducers that can be blocked depending on the position of an associated fader (302). That way, sound output from each of the strings (304) can be selectively turned on and off by a user of the electric guitar (300). When a fader (302) is in a position between the off position and the 100% on position, the electrical signal output to the amplifier is varied such that a characteristic of the signal can be selectively output to the amplifier by the user to provide great variation in the range of sound and volume characteristics output by the electric guitar (300) to the amplifier.

The electric guitar (300) may also comprise a plurality of buttons (308) with simple on/off functionality for an associated string (304). Each button (308) may be biased in the on or the off position. In some embodiments, a button (308) requires activation before a fader (302) associated with the same string (304) is effective to vary a characteristic of sound output to the amplifier for a respective string (304). In other embodiments, each button (308) may be effective to vary a characteristic of sound output to the amplifier for a respective string (304) only when a fader (302) associated with the same string (304) is not in the off position.

The electric guitar (300) is otherwise patentably indistinct from electric guitar (100). Controller (200) may be used in conjunction with electric guitar (100) or electric guitar (300).

In some embodiments of the invention, electric guitar (100, 300) may be configured to delay output of one or more strings (106, 304) to the amplifier once such strings (106, 304) have been activated by one or more pics (128). The pickup (116) still converts the output of a string (106, 304) into an electrical signal, but the electrical signal is held until a pre-determined time. This may be achieved by control circuitry of the electric guitar (100, 300), by the controller (200), or otherwise through use of external software executed on a computing device. The output of the strings (106, 304) is thus modified so that the output of all strings is transmitted to the amplifier at the same time, i.e., the output of all strings is auditorily played at the same time through a speaker connected to the amplifier, or by transmitting the output of each string to the amplifier in accordance with a pre-determined pattern that may be modified depending on the clock speed of the music track. This may be set by the rotational speed and swing state of the rotatable disc (120*a*, 120*b*).

Although embodiments of the invention are described in relation to an electric guitar, it will be appreciated that certain components and processes described herein would be applicable for use with acoustic guitars. For example, the rotatable disc(s) (120*a*, 120*b*) that are supported by a set of bearings (130) and turned by a motor (132) may be incorporated into an acoustic guitar and/or turned manually by hand using a handle mounted to a bearing.

The above description is for the purpose of teaching the person of ordinary skill in the art how to practice the present invention, and it is not intended to detail all those obvious modification and variations of which it will become apparent to the person of ordinary skill in the art upon reading this description. It is intended, however, that all such obvious modifications and variations be included within the scope of the present invention, which is defined by the following claims. The claims are intended to cover the claimed components and steps in any sequence which is effective to meet the objectives there intended, unless the context specifically indicates to the contrary.

The invention claimed is:

1. An electric guitar comprising:

a body;

a head connected to the body by a neck;

at least one string anchored to both the body and the head and extending along the neck;

at least one pickup for converting vibrations from the at least one string into electrical output signals;

a rotatable disc positioned underneath the at least one string and comprising a plurality of attachment points;

at least one pic comprising a body configured to be received by an attachment point of the rotatable disc and a flexible wire member extending from the body away from the rotatable disc;

a drive means configured to rotate the rotatable disc relative to the body such that each time the at least one pic passes the at least one string it engages therewith causing the at least one string to vibrate and the at least one pickup generates an electrical signal; and an output jack for outputting the electrical signal to an amplifier.

2. An electric guitar according to claim 1, wherein the rotatable disc comprises an annular steel disc and a non-ferrous covering and an aperture therethrough such that the at least one string is anchored to the body inside the rotatable disc.

3. An electric guitar according to claim 2, wherein the non-ferrous covering comprises a plurality of cut-outs, each cut-out defining an attachment point for receiving a respective pic therein.

4. An electric guitar according to claim 3, wherein each pic comprises a body having a first end comprising a magnet and a second end having a flexible wire member extending therefrom, and wherein the first end of each pic is inserted into a respective cut-out through the non-ferrous covering of the rotatable disc and the magnet engages the steel disc.

5. An electric guitar according to claim 4, wherein the at least one pic comprises a plurality of pics and the dimension of each of the plurality of pics from the first end thereof to the end of the flexible wire member is the same for each respective pic.

6. An electric guitar according to claim 1 further comprising a primary switch associated with each of the at least one strings that can be toggled between an on position in which vibrations from the at least one string are allowed to pass through the primary switch for output to an amplifier by the at least one pickup and an off position in which vibrations from the at least one string are blocked to prevent the signals passing through the primary switch for output to an amplifier.

7. An electric guitar according to claim 6, wherein the at least one string comprises six strings and the primary switch comprises six switches, wherein each switch is associated with a respective string.

8. An electric guitar according to claim 7, further comprising six secondary switches, wherein each secondary switch is associated with a respective primary switch and string, and wherein when a primary switch is in the off position, the associated secondary switch is operable to selectively permit a signal from the associated string to pass through the secondary switch for output to the amplifier.

9. An electric guitar according to claim 7, wherein each secondary switch is in the form of a depressible button.

10. An electric guitar according to claim 1 further comprising at least one motor operable to turn the rotatable disc relative to the body.

11. An electric guitar according to claim 10 further comprising a plurality of bearings for engaging the rotatable disc.

12. An electric guitar according to claim 1, wherein the rotatable disc comprises a plurality of rotatable discs independently rotatable relative to one another.

13. An electric guitar according to claim 1 wherein the rotatable disc comprises a first half and a second half joinable together to form a disc and attachment means for attaching the first and second half of the rotatable disc together.

14. An electric guitar according to claim 1, wherein the rotatable disc comprises a plurality of rotatable discs arranged concentrically such that each of the plurality of rotatable discs is operable to rotate independently of any other rotatable disc.

15. A system for generating sound comprising: an electric guitar according to claim 1 and a controller for controlling rotation of the rotatable disc.

16. A system for generating sound comprising: an electric guitar according to claim 10 and a controller for controlling rotation of the rotatable disc, wherein the controller comprises a first control for varying a constant speed of the at least one motor and a second control for varying a variable speed of the at least one motor along the path of rotation of the rotatable disc.

17. A system for generating sound according to claim 16, wherein the controller further comprises a third control for varying a variable speed of the at least one motor at multiple points around each rotation of the rotatable disc.

18. A system for generating sound according to claim 17, wherein the controller further comprises a fourth control for controlling signals transmitted from a programmable circuit board to the controller to sync rotation of the rotatable disc with, before or behind the beat of a soundtrack.

19. A system for generating sound according to claim 18, wherein the controller further comprises a fifth control for selectively determining whether the beat of the soundtrack is controlled by the fourth control of the controller or an external device.

20. A system for generating sound according to claim 19, wherein one or more of the first control, second control, third control, fourth control or fifth control may be performed by a foot pedal.

* * * * *